United States Patent [19]

Clark et al.

[11] Patent Number: 4,978,696

[45] Date of Patent: Dec. 18, 1990

[54] OPTICALLY CLEAR ORGANOSILOXANE ADHESIVE COMPOSITIONS

[75] Inventors: Joseph N. Clark, Mapleton; David G. Coble; Loretta N. Kroupa, both of Midland, all of Mich.

[73] Assignee: Dow Corning Corporation, Midland, Mich.

[21] Appl. No.: 369,882

[22] Filed: Jun. 22, 1989

[51] Int. Cl.$^5$ ................................................ C08K 9/06
[52] U.S. Cl. ...................................... 523/212; 524/264; 524/268; 524/588; 524/731; 525/478
[58] Field of Search ................. 525/478; 524/588, 264, 524/268, 731; 523/212

[56] References Cited

U.S. PATENT DOCUMENTS

| | | | |
|---|---|---|---|
| 3,699,072 | 10/1972 | Clark et al. | 260/37 |
| 3,892,707 | 7/1975 | Itoh et al. | 260/37 |
| 4,082,726 | 4/1978 | Mine et al. | 260/46.5 |
| 4,196,273 | 4/1980 | Imai et al. | 528/15 |
| 4,329,273 | 5/1982 | Hardman et al. | 524/862 |
| 4,490,500 | 12/1984 | Smith | 524/378 |

Primary Examiner—Melvyn I. Marquis
Attorney, Agent, or Firm—Robert Spector

[57] ABSTRACT

Liquid organosiloxane compositions that cure by a hydrosilylation reaction and contain from 0.1 to about 2 weight percent of a low molecular weight polymethylvinylsiloxane cure to form adhesives that are sufficiently flexible to retain cohesive bonding between substrates exhibiting different coefficients of thermal expansion when the resulting composite is exposed to variations in temperatures during use. The flexibility of the cured adhesive is further increased by addition to the curable compositions of a liquid polydimethylsiloxane having a silanol group at one of the two terminal positions and a triorganosiloxy group at the second terminal position. Preferred compositions are packaged in at least two parts, with the organohydrogensiloxane and the hydrosilylation catalyst being located in different parts of said composition.

7 Claims, No Drawings

OPTICALLY CLEAR ORGANOSILOXANE ADHESIVE COMPOSITIONS

BACKGROUND OF THE INVENTION

1. Field of the Invention

This invention relates to optically clear organosiloxane compositions. More particularly, this invention relates to curable organosiloxane compositions capable of cohesively bonding layers of glass and/or organic polymers. The cured compositions are sufficiently flexible to compensate for differences in the coefficients of thermal expansion of the materials being bonded.

2. Description of the Prior Art

Many methods have been proposed for imparting adhesion to organosiloxane compositions that cure by the addition reaction of lower alkenyl radicals with silicon-bonded hydrogen atoms in the presence of a platinum catalyst. Some of these methods involve addition of various types of adhesion promoters to the compositions.

Addition of a silane containing both alkenyl radicals and silicon-bonded alkoxy groups or a partial hydrolysis product of the silane to a curable organosiloxane composition is taught in U.S. Pat. No. 4,196,273, which issued to Imai and Tanaka on Apr. 1, 1980, U.S. Pat. No. 4,329,273, which issued to Hardman et al on May 11, 1982, and in Japanese Patent Publication No. 76/28309.

The use as adhesion promoters of silanes containing both silicon-bonded hydrogen atoms and silicon-bonded alkoxy groups and partial hydrolysis products of these silanes is described in Japanese Patent Publication No. 82/5836.

Curable compositions wherein the adhesion promoter is a linear or cyclic polyorganosiloxane wherein each molecule contains substituents selected from lower alkenyl. silicon-bonded hydrogen. silicon-bonded alkoxy, epoxy and ester groups are described in U.S. Pat. No. 3,699,072, which issued to Clark and Hayes on Oct. 17, 1972, U.S. Pat. No. 4,082,726, which issued to Mine et al on Apr. 4, 1978, Japanese patent publication No. 80/39258, and Japanese published application (Kokai) Nos. 54/58755 and 54/58756.

The use of a lower enoxysilane or a partial hydrolyzate thereof as an adhesion promoter is disclosed in U.S. Pat. No. 3,892,707, which issued to Itoh and Harada on July 1, 1975.

Each of the aforementioned prior art adhesion promoters has disadvantages associated with its use. The presence of both a lower alkenyl radical and an alkoxy group in a single silane interferes with the addition reaction and slows the cure rate. Siloxanes containing epoxy or ester groups are not completely miscible the principal siloxane ingredient, and the composition becomes cloudy following the addition. In addition, trimethoxysilane is an extremely toxic material.

Japanese Patent Publication No. 58/101177, which issued on June 16, 1983 discloses improving the moisture resistance and adhesive strength of an adhesive sheet that is placed over a sheet of window glass. The glass is coated with an aqueous solution containing a surfactant and a silane containing a methoxy, ethoxy or silanol group and a vinyl, epoxy, methacryl or mercapto group. The adhesive sheet can be a polyester film that is adhered by means of acrylic ester type adhesives.

U.S. Pat. No. 4,490,500, which issued to Smith on Sept. 9, 1982 discloses compositions suitable for encapsulating electronic components. The compositions contain an organopolysiloxane with terminal silanol groups, an organosiloxane copolymer containing triorganosiloxy and $SiO_2$ groups, and a prereacted catalyst mixture containing an alkyl silicate or partial hydrolysis product and a stannic carboxylate.

While many prior art additives will enable organosiloxane compositions curable by a hydrosilylation reaction to cohesively bond to a variety of organic and inorganic substrates, the compositions are not suitable for bonding substrates having widely differing coefficients of thermal expansion. The reason for this is that the cured organosiloxane material is not sufficiently flexible to absorb the stresses originating from the different rates at which the bonded substrates shrink or expand with changes in environmental temperature. If not absorbed or dissipated in some manner, these stresses can result in failure of the adhesive bond between the substrates.

An objective of this invention is to provide optically clear organosiloxane compositions capable of cohesively bonding to glass and a variety of organic polymers while exhibiting sufficient flexibility to absorb the stresses resulting from differences in the coefficients of thermal expansion of the materials being bonded.

SUMMARY OF THE INVENTION

The present invention is based on the discovery that liquid organosiloxane compositions that cure by a hydrosilylation reaction and contain from 0.1 to about 2 weight percent of a low molecular weight polymethylvinylsiloxane cure to form adhesives that are sufficiently flexible to retain cohesive bonding between substrates exhibiting different coefficients of thermal expansion when the resulting composite is exposed to variations in temperatures during use. The flexibility of the cured adhesive is further increased by addition to the curable composition of a liquid polydimethylsiloxane having a silanol group at one of the terminal positions and a triorganosiloxy group at the second terminal position.

DETAILED DESCRIPTION OF THE INVENTION

This invention provides an improved optically clear liquid organosiloxane composition exhibiting cohesive bonding to substrates selected from the group consisting of glass and synthetic organic polymers, said composition comprising A. a liquid diorganovinylsiloxy-terminated polydimethylsiloxane, B. an optically clear reinforcing filler, C. an amount of a liquid organohydrogensiloxane sufficient to cure said composition to a solid material, D. an amount of a hydrosilylation reaction catalyst sufficient to promote curing of said composition, and E. an amount of a first liquid polydimethylsiloxane sufficient to achieve cohesive bonding between said composition and said substrates, where said first polydimethylsiloxane contains a silanol group at each of the terminal positions. The improvement comprises the presence in said composition of F. from 0.1 to 2 weight percent, based on the weight of said composition, of a liquid silanol-terminated polymethylvinylsiloxane containing an average of from 2 to 20 repeating units per molecule, and G. from 0 to 25 percent, based on the weight of said composition, of a second liquid polydimethylsiloxane containing a silanol group at one of the two terminal positions and a triorganosiloxy group at the second terminal position.

This invention also provides a method for increasing the elongation and reducing the modulus of a cured, optically transparent organosiloxane elastomer prepared from a curable composition comprising a diorganovinylsiloxy-terminated polydimethylsiloxane, an amount of an organohydrogensiloxane sufficient to cure said polydimethylsiloxane, a reinforcing filler, an amount of a hydrosilylation catalyst sufficient to promote curing of said composition, and a polydimethylsiloxane containing a silanol group at each terminal position in an amount sufficient to achieve adhesion between said elastomer and a substrate. The method comprises incorporating into the curable composition from 0.1 to 2 percent, based on the weight of said composition, of a liquid polymethylvinylsiloxane containing an average of from 2 to 20 repeating units per molecule. At least 0.1 percent, based on the weight of said curable composition, of a liquid polydimethylsiloxane containing a silanol group at one terminal position and a triorganosiloxy group at the second terminal position can be added to impart additional flexibility to the cured composition.

The Polymethylvinylsiloxane

The inventive feature of the present compositions resides in the presence of from 0.1 to about 2 percent, based on the weight of the composition, of a low molecular weight polymethylvinylsiloxane containing an average of from 2 to 20 repeating units per molecule. The terminal groups of the polymer are silanol. This ingredient lowers the elongation and increases the modulus of the cured composition sufficiently to achieve a level of flexibility capable of absorbing stresses resulting from the unequal rates of expansion or contraction of two dissimilar substrates that are bonded using the composition.

The beneficial effect of the polymethylvinylsiloxane may not be evident at concentrations below about 0.1 weight percent, and this ingredient may not be compatible with the other ingredients of the composition at concentrations greater than about 2 weight percent. The haze resulting from this incompatibility detracts from the optical clarity of the cured composition.

The concentration of the polymethylvinylsiloxane is preferably from 0.5 to 1.5 weight percent.

The Silanol-Terminated Polydimethylsiloxane

The presence of a liquid polydimethylsiloxane containing a silanol group at both terminal positions referred to hereinafter as the silanol-terminated polydimethylsiloxane, enables the present compositions to cohesively bond to both glass and organic polymer substrates. To achieve cohesive bonding the curable compositions of this invention should contain at least 10 weight percent of the silanol-terminated polydimethylsiloxane. The viscosity of this polymer is preferably from 1 to about 100 Pa.s.

The accompanying examples demonstrate that compositions containing less than about 10 weight percent of a silanolterminated polydimethylsiloxane will not cohesively bond to a polycarbonate substrate. The concentration of this ingredient is preferably from 10 to about 20 percent, based on the total weight of the composition. The presence of more than 20 weight percent of this ingredient may adversely affect the physical properties of the cured elastomer.

The Optional Silanol/Triorganosiloxy Terminated Polydimethylsiloxane

A liquid polydimethylsiloxane containing one silanol terminal group and one triorganosiloxy terminal group is added when it is desired to obtain a higher elongation and lower modulus than can be achieved using up to about 2 percent of the polymethylvinylsiloxane, which appears to be the upper limit for an optically clear composition. Up to about 25 weight percent of the silanol/triorganosiloxy-terminated polydimethylsiloxane can be present in the curable compositions of this invention without adversely affecting the ability of the cured composition to cohesively bond to a substrate. The concentration of this ingredient is preferably from 3 to about 17 percent, based on the total weight of the curable composition.

The silanol/triorganosiloxy terminated polydimethylsiloxane preferably exhibits a viscosity of from 1 to about 100 Pa.s at 25° C. and the triorganosiloxy terminal group is preferably trimethylsiloxy.

The Diorganovinylsiloxy-Terminated Polydimethylsiloxane

The major ingredient of the present curable compositions is a liquid diorganovinylsiloxy-terminated polydimethylsiloxane. The viscosity of this polymer is preferably at least 1 Pa.s at 25 degrees C.

The viscosity of this polydimethylsiloxane can range from a pourable liquid to a gel that will flow only under pressure.

Methods for preparing vinyl-terminated polydimethylsiloxanes are sufficiently well known to those skilled in this art that a detailed description in this specification is not required. These methods include (1) hydrolysis/condensation of a dimethyldihalosilane and a dimethylvinylhalosilane and (2) polymerization of dimethylcyclosiloxanes, where the halogen is typically chlorine or bromine.

The Organohydrogensiloxane

The present compositions are cured to form an elastomer by a hydrosilylation reaction between the diorganovinylsiloxyterminated polydimethylsiloxane and an organohydrogensiloxane containing at least 3 silicon-bonded hydrogen atoms per molecule. The organohydrogensiloxane contains from as few as four silicon atoms per molecule up to an average of 20 or more, and can have a viscosity of up to 10 Pa.s or higher at 25° C. The repeating units present in this ingredient include but are not limited to $HSiO_{1.5}$, $RHSiO$ and/or $R_2HSiO_{0.5}$ in addition to one or more of monoorganosiloxy. diorganosiloxane, triorganosiloxy and $SiO_2$ units. In these formulae R represents a monovalent hydrocarbon or halogen-substituted hydrocarbon radical, where the halogen is typically fluorine or chlorine. The hydrocarbon radicals represented by R include but are not limited to alkyl such as methyl, aryl such as phenyl and alkaryl such as tolyl. Halogen-substituted hydrocarbon radicals include chloromethyl and 3,3,3-trifluoropropyl.

Alternatively the organohydrogensiloxane can be a cyclic compound containing diorganosiloxane and organohydrogensiloxane units or a compound of the formula $Si(OSiR_2H)_4$.

To ensure compatibility between the ingredients of the present curable compositions the hydrocarbon radical represented by R is most preferably methyl and the organohydrogensiloxane is a linear trimethylsiloxy terminated dimethylsiloxane/-methylhydrogensiloxane copolymer containing an average of from 10 to about 50 repeating units per molecule of which from 3 to 5 are methylhydrogensiloxane.

The molar ratio of the silicon-bonded hydrogen atoms present in the organohydrogensiloxane to the vinyl radicals present in the polydiorganosiloxane and the organosiloxane copolymer described hereinafter determines the extent of cure of the present compositions and the physical properties of cured elastomers prepared from these compositions. This ratio is typically from 0.2 to about 5.

The Hydrosilylation Catalyst

The reaction between (1) vinyl-containing organosilicon compounds such as the present polydiorganosiloxanes and organosiloxane copolymers and (2) organohydrogensiloxanes are typically conducted in the presence of a catalyst. One class of frequently used catalysts include metals from the platinum group of the periodic table and compounds of these metals. Platinum compounds such as hexachloroplatinic acid, and particularly complexes of these compounds with relatively low molecular weight vinyl-containing organosiloxane compounds ar preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3.3.3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing organosilicon compounds, organohydrogensiloxanes and platinumcontaining catalysts may begin to cure at ambient temperature. To increase the storage stability of these compositions or obtain a longer working time or "pot life". the activity of the catalyst under ambient conditions can be retarded or suppressed by the addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol and acetylenic hydrocarbons such as ethynylcyclohexane constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1876 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

The Optically Clear Reinforcing Filler

One type of reinforcing filler suitable for use in the present curable organosiloxane compositions are organosiloxane copolymers containing repeating units of the general formula $SiO_2$ in addition to triorganosiloxy units of the general formulae $R'_3SiO_{\frac{1}{2}}$ and diorganovinylsiloxy units of the general formula $CH_2=CH(R'')_2SiO_{\frac{1}{2}}$. In these formulae R' and R'' individually represent monovalent hydrocarbon or halogenated hydrocarbon radicals containing from 1 to about 10 carbon atoms as previously defined for the R radicals of the organohydrogensiloxane, and are free of ethylenic unsaturation.

To ensure compatibility of the reactants and transparency of the cured polyorganosiloxane elastomer it is preferable that the silicon bonded hydrocarbon radicals present on the polydimethylsiloxane, organosiloxane copolymer and organohydrogensiloxane be identical. Most preferably these hydrocarbon radicals are methyl or a combination of methyl with up to about 5 mole percent of either phenyl or 3.3.3-trifluoropropyl, this preference being based on the availability of the intermediates used to prepare the organosiloxane copolymer.

The molar ratio of the combination of triorganosiloxy units and diorganovinylsiloxy units to $SiO_2$ units in the organosiloxane copolymer is from 0.7 to 1.1. inclusive. The copolymer preferably contains at least two vinyl radicals per molecule, and the vinyl radicals constitute from 1.5 to 3.5 weight percent of the copolymer.

In preferred embodiments of the copolymer the ranges for the molar ratio of diorganovinylsiloxy: triorganosiloxy:$SiO_2$ units is 0.08–0.1:0.6–1:1.

The organosiloxane copolymer can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for use in the present compositions. The hydroxyl content of the copolymer can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The organosiloxane copolymers used in the present compositions can be obtained by reacting Daudt et al's. product with the required amount of a hexaorganodisilazane or a hexaorganodisiloxane wherein each silicon atom contains a vinyl radical and two methyl or other hydrocarbon radicals represented by R''' in the foregoing formula.

Alternatively, the silica hydrosol of Daudt et al. can be replaced with an alkyl orthosilicate and the triorganohalosilane with a triorganoalkoxysilane.

When an organosiloxane copolymer is used as the reinforcing filler, the concentration of this ingredient is typically from 10 to about 50 parts by weight per 100 parts of the diorganovinylsiloxy-terminated polydimethylsiloxane.

A second class of optically transparent reinforcing fillers includes finely divided silica of the type described in U.S. Pat. No. 4,344,800, which issued to M. Lutz on Aug. 17, 1982. This patent is hereby incorporated by reference as a teaching of silica fillers suitable for use in transparent organosiloxane elastomer compositions.

Reinforcing silica fillers are typically treated with a low molecular weight organosilicon compound to prevent a phenomenon referred to as "creping" or "crepe hardening". These silica treating agents reduce the interaction between the polydiorganosiloxane and the reinforcing silica that causes the base to undergo an irreversible increase in viscosity during processing, to the extent that it is no longer processible using conventional techniques.

Suitable silica treating agents are well known in the art, and include but are not limited to hydroxyl terminated short chain polydiorganosiloxane fluids and hexaorganodisilazanes. At least 90 weight percent of the silica treating agent should be compatible with the polydiorganosiloxane gum referred to hereinbefore as ingredient A. The silica treating agent typically constitutes from about 2 up to about 15 percent by weight of the curable composition.

Packaging of the Present Compositions

Because curing of the present compositions can occur at room temperature even in the presence of a platinum catalyst inhibitor, the long-term storage stability of curable compositions containing both the organohydrogenpolysiloxane and the platinum catalyst is sometimes less than desirable. For this reason the compositions are typically stored and transported in at least two parts. One of these parts includes the organohydrogenpolysiloxane and a second contains the platinum-containing hydrosilylation catalyst.

To facilitate measuring and blending quantities of the two-part compositions that constitute a preferred embodiment of this invention, both of these parts preferably include a portion of the total amount of the aforementioned diorganosiloxy-terminated polydimethylsiloxane and a portion of any reinforcing filler.

When the present compositions are packaged in more than two parts, the additional parts typically contain pigments, dyes, catalyst inhibitors and/or any of the other optional ingredients discussed in this specification. These additional parts can also include diorganovinylsiloxy-terminated polydimethylsiloxane to facilitate blending of these parts with the remaining parts to form a homogeneous curable composition.

EXAMPLE

This example is intended to describe preferred embodiments of the present invention and should not be interpreted as limiting the scope of the invention as defined in the accompanying claims. Unless otherwise specified all parts and percentages specified in the examples are by weight and viscosities were measured at 25 degrees C.

Curable organosiloxane compositions were prepared by blending the following ingredients to homogeneity:

A dimethylvinylsiloxy-terminated polydimethylsiloxane having a viscosity of about 30 Pa.s (ingredient A);

33.3 percent, based on the weight of ingredient A. of a resinous copolymer consisting essentially of triorganosiloxy units and $SiO_2$ units in the molar ratio of about 0.7 mol of triorganosiloxy units per mol of $SiO_2$ units. The triorganosiloxy units are trimethylsiloxy units and dimethylvinylsiloxy units and the copolymer contains from 1.4 to 2.2 weight percent of silicon-bonded vinyl radicals (Ingredient B);

as the crosslinker, a trimethylsiloxy-terminated dimethylsiloxane/methylhydrogensiloxane copolymer containing 64 mole percent methylhydrogensiloxane units and about 0.8 weight percent silicon bonded hydrogen atoms (ingredient C); and 0.14 percent, based on the weight of the curable composition, of a reaction product of hexachloroplatinic acid and symtetramethyldivinyldisiloxane that has been diluted with a liquid dimethylvinylsiloxy terminated polydimethylsiloxane in an amount sufficient to achieve a platinum content 0.7 weight percent, based on the weight of the curable composition.

The silanol-terminated polyorganosiloxanes that were added to modify the adhesion, elongation and modulus of the cured compositions included:

A hydroxyl-terminated polymethylvinylsiloxane exhibiting containing an average of 13 repeating units per molecule, referred to hereinafter as ingredient D.

A polydimethylsiloxane exhibiting a viscosity of 12 Pa.s wherein 7.5 mole percent of the terminal groups are trimethylsiloxy and the remainder are silanol, referred to hereinafter as ingredient E., the concentration of polymer containing silanol and trimethylsiloxy terminal groups being separately listed in Table 1 under the heading $SiOH/Me_3SiO$ polymer.

A mixture of (1) 75 weight percent of a hydroxyl-terminated polydimethylsiloxane having an approximate number average molecular weight of 40,000 in combination with a cyclic polydimethylsiloxane having a degree of polymerization of from 4 to 30, the combination having a viscosity of about 13.5 Pa.s at 25 degrees C. and (2) 25 weight percent of ingredient B, the mixture being referred to hereinafter as ingredient F.

Ingredients A, B and C were combined with one or more of ingredients D, E and/or F in the amounts shown in the following Table 1. The resultant optically transparent curable compositions were then evaluated with respect to (1) their ability to adhere a stainless steel screen to an optically clear polycarbonate substrate and (2) the elongation and modulus at 100% elongation of the cured organosiloxane composition itself. A relatively high elongation (greater than about 250%) and a modulus less that about 300 p.s.i (2.07 mPa) are desirable to achieve the flexibility required to relieve the stresses resulting from the difference in coefficients of thermal expansion between dissimilar substrates that are bonded using the present organosiloxane compositions.

Preparation of Test Samples For Determining Peel Strength

Laminates were prepared by coating the primed surface of a sheet of optically clear polycarbonate available as Tuffak A (R) from the Rohm and Haas Company with a liquid curable organosiloxane composition. The dimensions of the sheet were 3.8×15.2×0.6 cm. The primer was applied using a spray gun adjusted for a vertical fan pattern. The thickness of the primer layer was about 2000 angstroms.

The primer solution was prepared as described in example 1 of U.S. Pat. No. 4,795,775, the relevant portions of which are incorporated herein by reference.

The primer composition was prepared by blending the following ingredients to homogeneity.

2 parts of the product obtained by reacting equimolar amounts of 1,2-bis(trimethoxysilyl)ethane and the diallyl ether of trimethylolpropane in the presence of 1% by weight of tetrabutyl titanate (ingredient 1):

10 parts of a 20 percent by weight solution in ethyl acetate of a methyl methacrylate/3-methacryloxypropyltrimethoxysilane copolymer. (ingredient 2);

1 part of a trimethylsiloxy-terminated polymethylhydrogensiloxane exhibiting a viscosity of 0.13 Pa.s; and 87 parts of 3-methyl-1-buten-3-ol.

Ingredient 1 was prepared by heating the mixture of the reactants and catalyst to the boiling point with stirring. The methanol produced as a by-product of the reaction was continuously removed from the reaction mixture by distillation and collected. Heating of the reaction mixture was continued until the amount of alcohol equivalent to a substantially complete reaction had been collected. The final temperature of the reaction mixture was 160° C.

Ingredient 2 was prepared by reacting methyl methacrylate and 3-methacryloxypropyltrimethoxysilane in a molar ratio of 10:1 respectively, in the presence of 1 percent, based on total monomers, of 3-mercaptopropyltrimethoxysilane and a catalytic amount of benzoyl peroxide using ethyl acetate as the polymerization medium.

The primer-coated substrate was dried for one hour under ambient conditions. A strip of a gum type polydimethylsiloxane 6.3 mm wide and 1.27 mm high was then placed around the entire perimeter of the primed surface to serve as a dam for the curable organosiloxane composition to be evaluated. A 12.7 mm-long strip having the same composition, width and about half the height of the walls of the dam was placed parallel to and at a distance of about 1 cm, from each of the two shorter walls of the dam, and a third strip of the same material and dimensions was placed in the center of the substrate and parallel to the other two strips.

The volume enclosed by the walls of the dam was filled with a curable organosiloxane composition. A 12.5 mm-wide sheet of 30-mesh stainless steel screening was positioned so as to cover the entire area of the dam. The screening rested on the three strips of gum type polydimethylsiloxane that had been previously placed within the perimeter defined by the walls of the dam. One of the two narrower ends of the screening projected over the wall of the dam for a distance of about 7.5 cm. This allowed the screen to be grasped by the jaws of the device used to measure peel strength as described in a subsequent portion of this specification.

The screening had been previously washed with toluene, rinsed with acetone dried and then wiped with a piece of cheesecloth that had been saturated with a primer composition consisting essentially of 85 parts of VM&P naphtha (a commercially available mixture of liquid hydrocarbons boiling from about 40 to about 140 degrees C.); 5 parts of n-propyl orthosilicate; 5 parts of 2-methoxyethyl orthosilicate; 5 parts of tetra(n-butyl) titanate; and 0.05 parts of Rhodamine "B" dye. The primer was then allowed to dry for one hour under ambient conditions.

The layer of liquid organosiloxane composition on each of the test samples was cured by heating the sample for between 6 and 15 hours in an oven maintained at a temperature of 100° C.

Before the cured samples were evaluated an incision was made along the entire length of the boundary between the cured liquid silicone rubber composition and each of the two longer walls of the dam. The incisions penetrated to the polycarbonate substrate.

The degree to which the cured elastomer adhered to the polycarbonate substrate was then evaluated by subjecting the cured samples to an adhesion test similar to that described in ASTM test procedure no. D-903. The procedure was modified by exerting the peeling force at an angle of 90 degrees with respect to the plane of the substrate, rather than at an angle of 180 degrees as described in the ASTM test procedure.

The percent cohesive failure was determined by estimating by visual observation the percentage of substrate surface area having cured silicone rubber from the test sample adhering to it. A rating of 0% was considered adhesive failure.

The force required to peel the elastomer from the substrate was measured using a load cell associated with the device used to exert the force required to peel the elastomer layer from the substrate. These force values are recorded in Table 2.

Physical Properties of the Cured Elastomers

The elongation and modulus at 100 % elongation of each cured organosiloxane composition were determined using a tensionometer as described in ASTM test procedure no. D 412. The values are recorded in Table 2.

The amounts of ingredients A, B, C, D, E, and F in the compositions evaluated are listed in Table 1. Samples that were evaluated for comparative purposes are identified by the letter "c" following the sample number. Samples 1, 2, 3 and 4c contained 0.1 part of the platinum catalyst and the remaining samples contained 0.14. The samples that did not contain ingredient contained 0.5 part of cyclic dimethylsiloxanes.

TABLE 1

| Sample No. | A | B | C | D | E | F | SiOH/Me$_3$SiO Terminated Polymer |
|---|---|---|---|---|---|---|---|
| 1 | 52.10 | 17.36 | 6.30 | 1 | 0 | 23.14 | 0 |
| 2 | 52.58 | 17.53 | 5.40 | 1 | 2 | 21.05 | 0.3 |
| 3 | 52.53 | 17.50 | 5.50 | 1 | 5 | 18.70 | 0.75 |
| 4c | 53.15 | 17.72 | 4.55 | 0 | 5 | 18.98 | 0.75 |
| 5c | 66.27 | 22.09 | 5.50 | 1 | 5 | 0 | 0.75 |
| 6c | 66.65 | 22.21 | 5.50 | 1 | 10 | 0 | 1.5 |
| 7 | 59.15 | 19.71 | 6.00 | 1 | 14 | 0 | 2.1 |
| 8 | 56.98 | 18.99 | 5.90 | 1 | 17 | 0 | 2.6 |
| 9 | 52.49 | 17.50 | 5.50 | 1 | 23 | 0 | 3.5 |
| 10c | 52.73 | 17.57 | 5.70 | 0 | 0 | 23.4 | 0 |

TABLE 2

| Sample No. | Elongation (%) | Modulus (100% Elong.) (psi//mPa) | Adhesion Mode | Peel Strength (ppi//kn/m) |
|---|---|---|---|---|
| 1 | 252 | 280//1.9 | 100% cohesive | 11//1.9 |
| 2 | 364 | 153//1.1 | 100% cohesive | 14.5//2.5 |
| 3 | 383 | 158//1.1 | 100% cohesive | 21.5//3.8 |
| 4c | 231 | 368//2.5 | 100% cohesive | 14.5//2.5 |
| 5c | 405 | 143//1.0 | adhesive | 6.5//1.1 |
| 6c | 366 | 121//0.8 | adhesive | 7.5//1.3 |
| 7 | 312 | 255//1.8 | 100% cohesive | 19.5//3.4 |
| 8 | 285 | 230//1.6 | 100% cohesive | 20.5//3.6 |
| 9 | 299 | 170//1.2 | 100% cohesive | 13.5//2.4 |
| 10c | 111 | 548//3.8 | adhesive | 4//0.7 |

Sample 4c demonstrates the lower elongation higher modulus and poor adhesion obtained when the polymethylvinylsiloxane (ingredient D) is omitted from sample 3.

Samples 5c and 6c demonstrate that while the modulus and elongation are within acceptable ranges, the adhesion is unsatisfactory when the curable composition contains an insufficient concentration of silanol groups.

Sample 10c demonstrates the properties of an unmodified control containing only a silanol-terminated polydimethylsiloxane (ingredient F) as an adhesion promoter.

That which is claimed is:

1. In an optically clear liquid organosiloxane composition exhibiting cohesive bonding to a surface of substrates selected from the group consisting of glass and synthetic organic polymers, said composition comprising A. a liquid dimethylvinylsiloxy-terminated polydimethylsiloxane, B. an optically clear reinforcing filler, C. an amount of a liquid organohydrogensiloxane sufficient to cure said composition to a solid material, where the organic portion of said organohydrogensiloxane is selected from hydrocarbon radicals and halogen substituted hydrocarbon radicals where the halogen is fluorine and chlorine, D. an amount of a hydrosilylation reaction catalyst sufficient to promote curing of said composition, and E. an amount of a first liquid polydimethylsiloxane sufficient to achieve cohesive bonding between said composition and said substrates, where said first polydimethylsiloxane contains a silanol group at each of the two terminal positions, the improvement comprising the presence in said composition of F. from 0.1 to 2 weight percent, based on the weight of said composition, of a liquid silanol-terminated polymethylvinylsiloxane containing an average of from 2 to 20 repeating units per molecule, and G. from 0 to 25 percent, based on the weight of said composition, of a second liquid polydimethylsiloxane containing a silanol group at one of the two terminal positions and a trimethylsiloxy group at the second terminal position.

2. A composition according to claim 1 where said polymethylvinylsiloxane constitutes from 0.5 to 1.5 weight percent of said composition said first liquid polydimethylsiloxane constitutes from 10 to 20 weight percent of said composition, said second liquid polydimethylsiloxane constitutes from 3 to 17 weight percent of said composition and exhibits a viscosity of from 1 to 100 Pa.s at 25° C. said organohydrogensiloxane comprises repeating units selected from the group consisting of $HSiO_{1.5}$, RHSiO and $R_2HSiO_{0.5}$, where R represents a monovalent hydrocarbon or halogen-substituted hydrocarbon radical, said organohydrogensiloxane contains at least three silicon-bonded hydrogen atoms per molecule, the molar ratio of silicon-boned hydrogen atoms to vinyl radicals in said composition is from 0.2 to 5, inclusive, said reinforcing filler comprises an organosiloxane copolymer containing repeating units of the general formula $SiO_2$ in addition to triorganosiloxy units of the general formula $R'_3SiO_{\frac{1}{2}}$ and diorganovinylsiloxy units of the general formula $CH_2=CH(R''')_2SiO_{\frac{1}{2}}$, where R' and R'' individually represent monovalent hydrocarbon or halogenated hydrocarbon radicals containing from 1 to about 10 carbon atoms and are free of ethylenic unsaturation, the molar ratio of the combination of triorganosiloxy units and diorganovinylsiloxy units to $SiO_2$ units in said copolymer is from 0.7 to 1.1, inclusive, vinyl radicals constitute from 1.5 to 3.5 weight percent of said copolymer, and the hydrosilylation catalyst is selected from the group consisting of metals from the platinum group of the periodic table and compounds of these metals.

3. A composition according to claim 1 where said composition is packaged in at least to parts, with the organohydrogensiloxane and the hydrosilylation catalyst being located in different parts of said composition.

4. A composition according to claim 2 where R, R' and R'' are methyl, the organohydrogensiloxane is a linear trimethylsiloxy terminated dimethylsiloxane/methylhydrogensiloxane copolymer containing an average of from 10 to about 50 repeating units per molecule of which from 3 to 5 are methylhydrogensiloxane, said hydrosilylation catalyst is a complex of hexachloroplatinic acid and a linear low molecular weight vinyl-substituted organosiloxane, and the concentration of said catalyst is equivalent to from 5 to 50 parts of platinum per million of said composition.

5. In a method for increasing the elongation and reducing the modulus of a cured, optically transparent organosiloxane elastomer prepared from a curable composition comprising a liquid dimethylvinylsiloxy-terminated polydimethylsiloxane, an amount of an organohydrogensiloxane sufficient to cure said polydimethylsiloxane, where the organic groups present on said organohydrogensiloxane are hydrocarbon or halogenated hydrocarbon radicals where the halogen is fluorine or chlorine, a reinforcing filler, an amount of a hydrosilylation catalyst sufficient to promote curing of said composition, and a polydimethylsiloxane containing a silanol group at each terminal position in an amount sufficient to achieve adhesion between said elastomer and a surface of a substrate, the improvement comprising incorporation into the curable composition from 0.1 to 2 percent, based on the weight of said composition, of a liquid silanol-terminated polymethylvinylsiloxane containing an average of from 2 to 20 repeating units per molecule.

6. A method according to claim 5 where said composition additionally contains from 3 to 17 percent, based on the total weight of said composition, of a second liquid polydimethylsiloxane containing a silanol group at one of the two terminal positions and a triorganosiloxy group at the second terminal position, said polymethylvinylsiloxane constitutes from 0.5 to 1.5 weight percent of said composition, said first liquid polydimethylsiloxane constitutes from 10 to 20 weight percent of said composition, said organohydrogensiloxane comprises repeating units selected from the group consisting of $HSiO_{1.5}$, RHSiO and $R_2HSiO_{0.5}$, where R represents a monovalent hydrocarbon or halogen-substituted hydrocarbon radical, said organohydrogensiloxane contains at least three silicon-bonded hydrogen atoms per molecule, the molar ratio of silicon-boned hydrogen atoms to vinyl radicals in said composition is from 0.2 to 5, inclusive, said reinforcing filler comprises an organosiloxane copolymer containing repeating units of the general formula $SiO_2$ in addition to triorganosiloxy units of the general formula $R'_3SiO_{\frac{1}{2}}$ and diorganovinylsiloxy units of the general formula $CH_2=CH(R'')_2SiO_{\frac{1}{2}}$, where R' and R" individually represent monovalent hydrocarbon or halogenated hydrocarbon radicals containing from 1 to about 10 carbon atoms and are free of ethylenic unsaturation, the molar ratio of the combination of triorganosiloxy units and diorganovinylsiloxy units to $SiO_2$ units in said copolymer is from 0.7 to 1.1, inclusive vinyl radicals constitute from 1.5 to 3.5 weight percent of said copolymer, and the hydrosilylation catalyst is selected from the group consisting of metals from the platinum group of the periodic table and compounds of these metals.

7. A method according to claim 6 where R, R' and R" are methyl, the organohydrogensiloxane is a linear trimethylsiloxy terminated dimethylsiloxane/methylhydrogensiloxane copolymer containing an average of from 10 to about 50 repeating units per molecule of which from 3 to 5 are methylhydrogensiloxane, said hydrosilylation catalyst is a complex of hexachloroplatinic acid and a linear low molecular weight vinyl-substituted organosiloxane, and the concentration of said catalyst is equivalent to from 5 to 50 parts by weight per million parts of said composition.

* * * * *